United States Patent

[11] 3,589,655

| [72] | Inventors | Herbert F. Hackbarth<br>Worthington;<br>Arthur E. Reams, Columbus, both of, Ohio |
|---|---|---|
| [21] | Appl. No | 805,676 |
| [22] | Filed | Mar. 10, 1969 |
| [45] | Patented | June 29, 1971 |
| [73] | Assignee | Consolidated Kinetics Corporation<br>Columbus, Ohio |

[54] APPARATUS FOR ISOLATING VIBRATIONS
14 Claims, 8 Drawing Figs.

[52] U.S. Cl. ................................................ 248/20,
248/358, 267/114
[51] Int. Cl. ............................................... F16f 15/00
[50] Field of Search ........................................ 248/20, 21,
22, 23, 358, 13; 267/114; 248/19, 188.2

[56] References Cited
UNITED STATES PATENTS
| 2,956,761 | 10/1960 | Weber | 248/22 |
| 3,281,101 | 10/1966 | May | 248/22 |

Primary Examiner—Roy D. Frazier
Assistant Examiner—J. Franklin Foss
Attorney—Schmieding & Fultz ABSTRACT: A vibration isolation system of the type that includes a load-supporting means isolated from a base means by a resilient air chamber means that is controlled at constant level by a novel air controller means. The apparatus is further characterized by the air controller including an air discharge port that continuously bleeds air from the system and an air-releasing member positioned in relatively movable and confronting relationship with said air discharge port so as to control the airflow bleed from the system in equilibrium with the load-supporting force exerted by the resilient air chamber means.

INVENTOR.
HERBERT F. HACKBARTH
ARTHUR E. REAMS
BY
Schmieding & Fultz
ATTORNEYS

INVENTOR.
HERBERT F. HACKBARTH
ARTHUR E. REAMS
BY
Schmieding & Fultz
ATTORNEYS

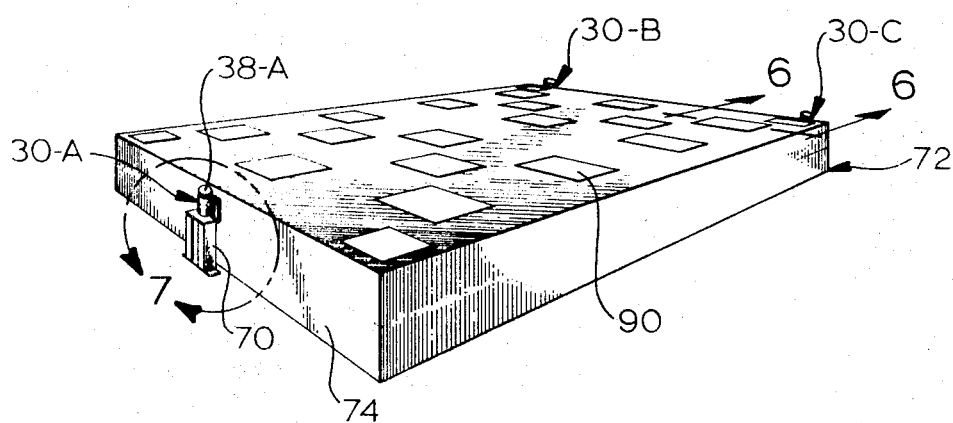
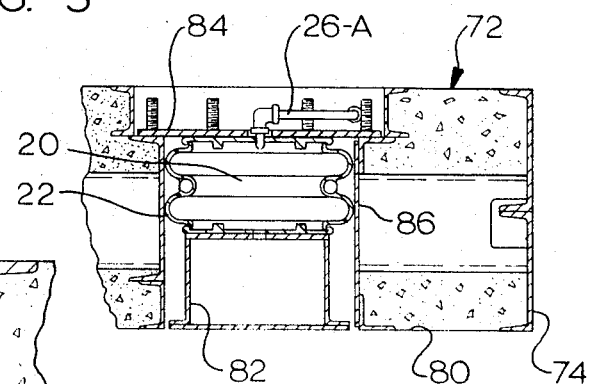
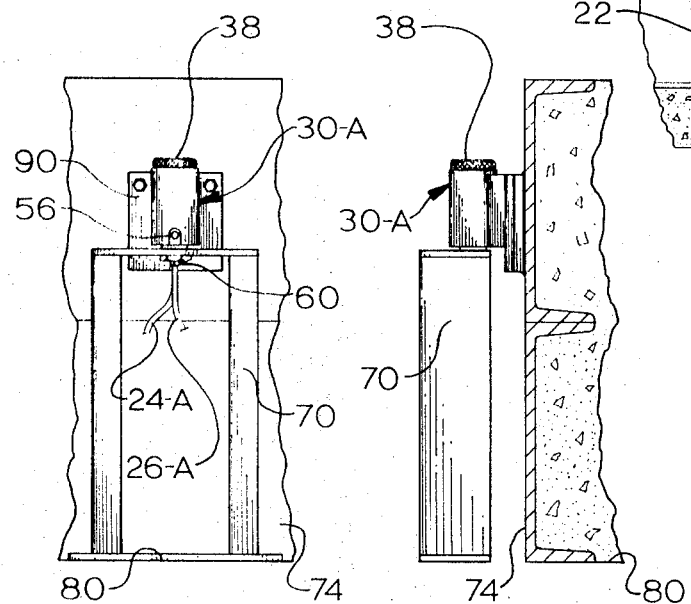

APPARATUS FOR ISOLATING VIBRATIONS

This invention relates to vibration isolators for supporting highly sensitive equipment or the like, and more particularly to an improved isolator mount and system adapted for automatic level control.

In general, the present invention comprises a vibration isolation mount that includes a base member and a load-supporting means isolated from one another by a resilient air chamber. The apparatus further comprises an improved air release controller that includes a body member preferably mounted on the base means which body member is provided with an inlet for receiving pressurized air from a source, and conduit means and an air discharged port for releasing air from said air chamber.

As one aspect of the present invention, the air release controller further includes a simple adjustable air release control member mounted on said load-supporting means so as to cooperate with said air discharge port of said body member, said control member being adjustable so as to selectively and precisely establish and maintain the normal predetermined height or level of said load-supporting means and any equipment supported thereon.

As another aspect of the present invention, an improved vibration isolation system is provided that comprises a load-supporting frame isolated from an underlying surface by a plurality of resilient air chambers located at spaced intervals. The system further includes improved air release controllers mounted at spaced intervals around said load-supporting frame, each of said controllers being arranged to control a respective group of said resilient chambers in such a manner as to precisely control the height and level of said load-supporting frame as well as any equipment supported thereon.

In general, the above-mentioned air release controllers each comprise an air control body member including a base portion for disposition on said underlying supporting surface, and a top portion provided with air inlets communicating with a source of pressurized air and a respective group of said air chambers, as well as an air discharge port. Each of said air controllers further includes a simple air release control member adjustably mounted on said load-supporting frame, said control members being adjustable so as to precisely establish and maintain the normal predetermined height and level of said load-supporting frame.

As another aspect of the present invention the above-described air release controllers are uniquely arranged so as to permit bottoming of the isolation mounts or systems, in the event of overload or air leakage from the resilient chambers, without the imposition of damaging stresses to components of said air release controllers.

As still another aspect of the present invention the above-described air release controllers comprise novel housing members that include upper portions forming guides for vertically movable air-releasing members and lower skirt portions forming protective covers for the cooperating air release body members.

As still another aspect of the present invention the air release controllers are provided with adjustable flow restrictors for precisely tuning the mounts or systems with precisely established damping action.

It is therefore an object of the present invention to provide an improved vibration isolation mount and system that includes a novel air release controller for precisely establishing and maintaining the level of a load with respect to the supporting environment.

It is another object of the present invention to provide an improved vibration isolation mount and system that is adapted to bottom in the event of leakage or overload without subjecting the sensitive control portion of the apparatus to damaging stresses.

It is another object of the present invention to provide an improved vibration isolation mount and system that includes a novel housing portion that functions as a guide for movable components of the apparatus as well as a protective movable cover for the main body portion of the apparatus.

It is still another object of the present invention to provide an improved vibration isolation mount and system that comprises a novel air release controller provided with means for tuning the apparatus to thereby precisely establish damped operation of the device.

Further objects and advantages of the present invention will be apparent from the following description, reference being had to the accompanying drawings wherein preferred forms of embodiments of the invention are clearly shown.

IN THE DRAWINGS

FIG. 5 is a perspective view of a vibration isolation system constructed in accordance with the present invention;

FIG. 6 is a partial end sectional view of the system of FIG. 5, the section being taken along the line 6—6 of FIG. 5;

FIG. 7 is a front elevational view of an air release controller comprising a portion of the system of FIGS. 5 and 6; and FIG. 8 is a side elevational view of the air release controller of FIG. 7.

Figure 1:
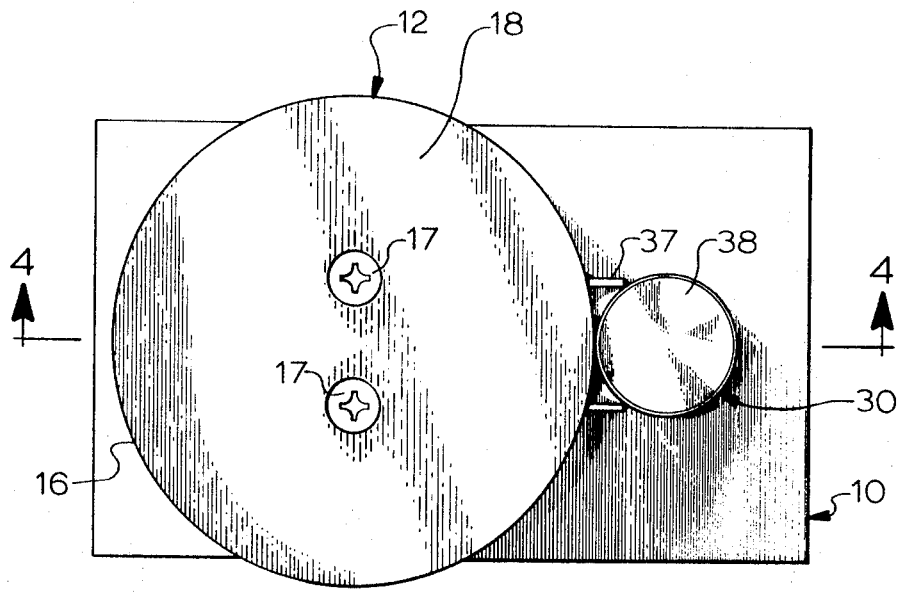
FIG. 1 is a top elevational view of a vibration isolation mount constructed in accordance with the present invention.
Figure 2:
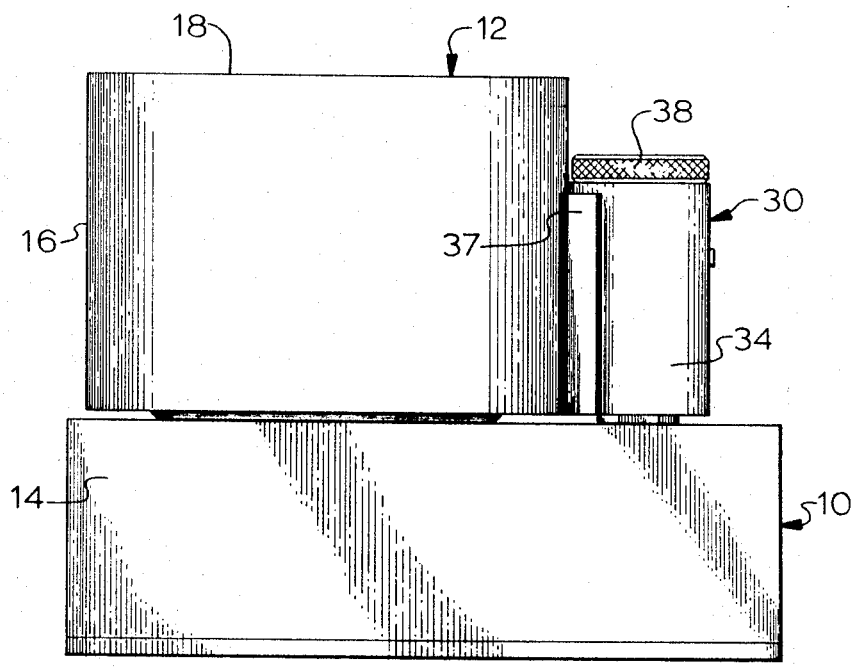
FIG. 2 is a side elevational view of a vibration isolation mount constructed in accordance with the present invention.
Figure 3:
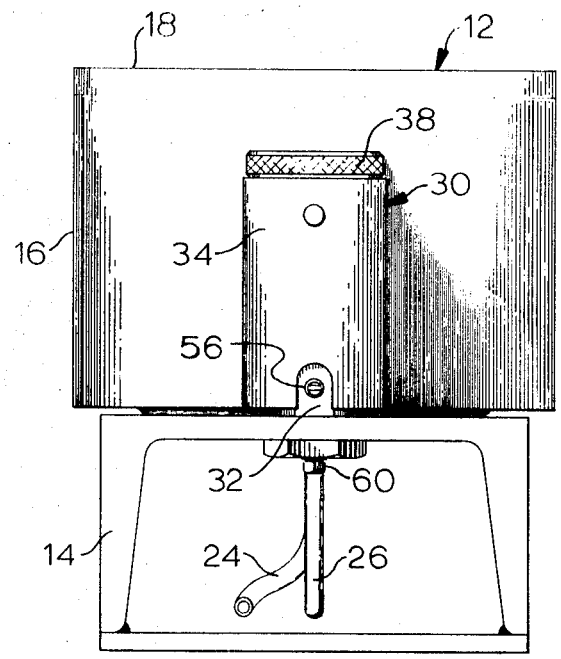
FIG. 3 is an end elevational view of a vibration isolation mount constructed in accordance with the present invention.

Referring in detail to the drawings, FIGS. 1—4 illustrate an isolation mount constructed in accordance with the present invention that includes a base means indicated generally at 10 and a load-supporting means indicated generally at 12, the latter including a sidewall 16 and a top wall 18.

A flexible air chamber 20 resiliently movably supports load-supporting means 12 on base means 10 and includes a flexible chamber wall 22 formed of synthetic rubber, or the like, top wall 19, and a bottom wall 21 including a threaded fitting forming a chamber port 64.

Top wall 18 of the load-supporting means 12 is secured to top wall 19 of the air chamber by a plurality of screws 17. Similarly, bottom wall 21 is secured to base 10 by a plurality of screws, one of which is seen at 23 rearwardly of fitting 64.

Figure 4:
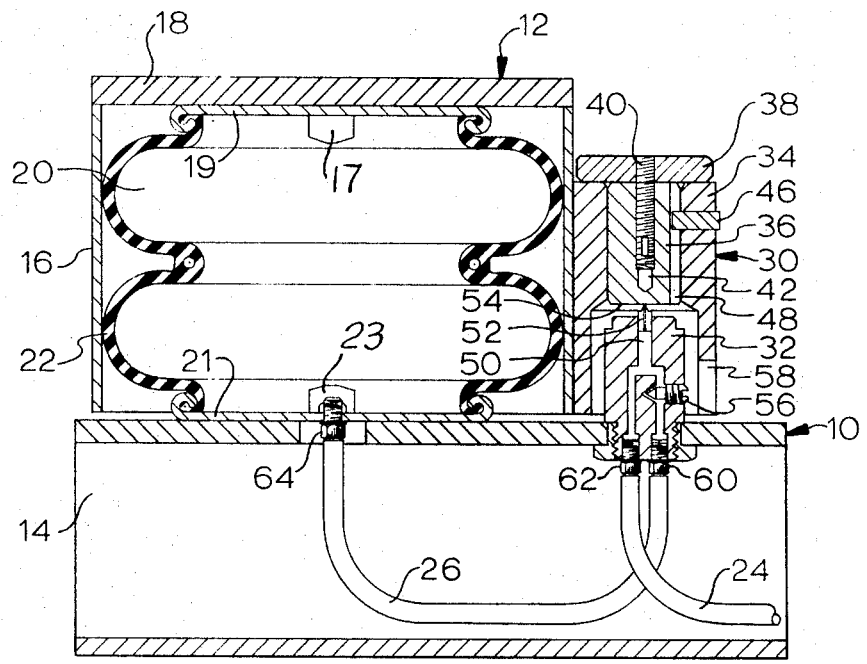
FIG. 4 is a side sectional of the vibration isolation mount of the present invention, with the section being taken along the line 4—4 of FIG. 1.

With reference to FIG. 4, and air controller indicated generally at 30 includes a body member 32 rigidly mounted on base means 10 that includes a passage or conduit 50 provided with an air discharge port or orifice 52 for controlling the release of pressurized air from the system when load-supporting means 12 tends to depart from a predetermined level in a manner later to be described.

With continued reference to FIG. 4 passage 50 includes inlet port 60 that communicates with a source of pressurized air, not illustrated, via a line 24, and a third port 60 that communicates with air chamber 20 via a line 26. An adjustable flow restrictor means 56, preferably in the form of a threaded needle valve and seat, is provided in passage 50 for controlling the flow rate in line 26 connecting air chamber 26 with air discharge orifice 52 and the above-mentioned source of pressurized fluid.

Referring again to FIG. 4, air controller 30 further includes a housing means 34 including an upper portion provided with a base forming a guide for a vertically slideable air control member 36, the latter being keyed against rotation in said bore by a key element 46 extended into a vertical slot 48.

Air control member 36 is free to move vertically upwardly and is vertically adjusted in its bore by a threaded element 40 disposed in threaded hole 42 and provided with a manual adjusting knob 38, said knob serving as an adjustable stop that limits the downward movement of said air control member.

As seen in FIG. 4, air control member 36 includes a lower surface 54 that abuts the previously mentioned air discharge port 52 in the top of body member 32 and serves to control the volumetric flow rate of air discharged from said port.

The housing means 34, FIG. 4, further includes a lower skirt portion that forms a protective cover for body member 32 and air discharge port 52, with a slot 58 being provided in said skirt portion to permit access to flow restrictor 56.

Reference is next made to FIGS. 5 through 8 which illustrate a vibration isolation system constructed in accordance with the present invention that includes a load-supporting frame indicated generally at 72 which is isolated from an underlying supporting surface 80 by plurality of air chambers 20 positioned at spaced locations.

Load-supporting frame 72 includes side surfaces 74 and a plurality of air controllers 30-A, 30-B and 30-C are positioned at spaced locations along said sidewall.

Each of the air controllers of the system of FIGS. 5—8 includes interior structure identical to air controller 30 of FIG. 4 previously described. As seen in FIGS. 5—8 the body member 32 of each of the air controllers is mounted on a pedestal or base 70 which in turn rests on the previously mentioned underlying supporting surface 80. Also, each air controller comprises a housing means 34 which is rigidly attached to a sidewall 74 of load-supporting frame 72 by means of a suitable mounting bracket 90.

With continued reference to the system of FIGS. 5—8 each of the air chambers 30 is disposed in a respective opening in frame 72, as seen in the sectional view of FIG. 6 with each air chamber being mounted between a base means forming a reservoir which is connected to the volume of air in chamber 20 to increase the effective volume and thereby providing highly advantageous decrease in the natural frequency of the system.

The opening for each air chamber 20 is preferably closed by a removable protective cover 92.

As seen in FIG. 5 load-supporting frame 72 is preferably levelized by three separate air controllers 30-A, 30-B, and 30-C with each of said controllers serving to control the flow of pressurized air to and from a respective group consisting of one-third of the total number of air chambers 20. However, the number of groups of air chambers 20 and air controllers such as 30-A can be varied without departing from the spirit of the present invention.

As seen in FIG. 6, conduits 26-A extend through the structural members of load-supporting frame 72 and interconnect the interiors of the air chambers of each particular group.

In operation, the height of the air control mount of FIGS. 1—4 is adjusted by rotating adjusting knob 38 and thereby raise or lower air control member 36 and the lower surface 54 thereof relative to the stationary body member 32. Such adjustment will in effect raise or lower the vertical position of load-supporting means 12 with respect to base means 10 since the upwardly exerted force from air chamber 20 will reach an equilibrium with the airflow bleed at air discharge port 52 thereby causing the surface 54 on air control member 36 to always ride at a threshold position in abutting relationship with air discharge port 52.

In the event that an air leak should occur in the wall of air chamber 20, and the load being supported would cause load-supporting means 12 to bottom then housing 34 of the relatively sensitive air controller can move freely downwardly and bottom without imposing any damaging stresses on the structural elements of the air controller.

The operation of the system of FIGS. 5—8 is identical to that just described except the load-supporting chambers 20, being pluralized at specified locations, are separately controlled in groups by the plurality of separate individually adjusted air controllers 30-A, 30-B and 30-C.

As is best seen in FIG. 7, air lines 24-A and 26-A are provided to deliver and exhaust air from the air controllers 30-A, 30-B, and 30-C.

We claim:

1. A vibration isolation mount comprising, in combination, base means; load-supporting means; an air chamber operatively interposed between said base means and load-supporting means; a conduit means connecting said air chamber with a source of pressurized air, said conduit means including an air discharge port positioned in referenced relationship with one of said means; an air control member positioned in referenced relationship with the other of said means and abutting said port for relative movement therewith for controlling the discharge of airflow bleed therefrom; and means for adjusting the relative location of said member and port for selectively establishing the normal height of said load-supporting means.

2. A vibration isolation mount comprising, in combination, base means; load-supporting means; an air chamber between said base means and load-supporting means; and air control body member mounted on said base means and including a surface provided with an air discharge port, an inlet port for connection with a source of pressurized fluid, and a third port communicating with said air chamber; an air-releasing member mounted on said load-supporting means including a shoulder abutting said air discharge port for controlling the airflow bleed therefrom; and means for vertically adjusting one of said members relative to the respective means on which it is mounted for selectively establishing the normal height of said load-supporting means.

3. The apparatus defined in claim 2 that includes an adjustable flow restrictor between said air chamber and said air discharge port.

4. A vibration isolation mount comprising, in combination, base means; load-supporting means; and air chamber between said base means and load-supporting means; an air control body member mounted on said base means and including a surface provided with an air discharge port, an inlet port for connection with a source of pressurized fluid, and a third port communicating with said air chamber; guide means mounted on said load-supporting means; an air-releasing member movably mounted on said guide means and including a shoulder abutting said air discharge port for controlling the airflow bleed therefrom; and adjusting means operative between said air-releasing member and said guide means for moving said member along said guide means.

5. The apparatus defined in claim 4 that includes an adjustable flow restrictor between said air chamber and said air discharge port.

6. A vibration isolation mount comprising, in combination, base means; load-supporting means; an air chamber between said base means and load-supporting means; an air control body member mounted on said base means and including a surface provided with an air discharge port for normally bleeding air from the system, an inlet port for connection with a source of pressurized fluid, and a third port communicating with said air chamber; housing means mounted on said load-supporting means and including a vertically extending bore forming a guide and a lower skirt portion forming a cover for said air control body member; an air-releasing member vertically movably mounted in said guide for controlling the airflow bleed from said air discharge port; and adjusting means operative between said air-releasing member and said housing means for movably adjusting said member relative to said guide.

7. The apparatus defined in claim 6 that includes an adjustable flow restrictor between said air chamber and said air discharge port.

8. A vibration isolation system for mounting sensitive apparatus and the like on an underlying supporting means comprising, in combination, a load-supporting frame means; a plurality of air chambers positioned at spaced locations between said load-supporting frame means and said underlying supporting means; a plurality of air controllers positioned at spaced locations along said frame means, each of said air controllers including a conduit and air discharge port mounted on one of said means for connecting certain of said air chambers with a source of pressurized air, and an air control member mounted on the other of said means and movably abutting said port for controlling the discharge of airflow bleed therefrom;

and means for adjusting the relative location of certain of said air control members and respective ports for selectively establishing the normal heights of said frame means at said spaced locations.

9. A vibration isolation system for mounting sensitive apparatus and the like on an underlying supporting means comprising, in combination, a load-supporting frame means; a plurality of air chambers positioned at spaced locations between said load-supporting frame means and said underlying supporting means; a plurality of air controllers positioned at spaced locations along said frame means, each of said air controllers including an air control body member including a base portion for disposition on said underlying supporting means, a top portion provided with an air discharge port, an inlet port for connection with a source of pressurized fluid, and a third port communicating with certain of said air chambers, each of said air controllers also including a guide means mounted on said frame means; an air-releasing member vertically slideably mounted on said guide means and including a lower shoulder confronting said air discharge port for controlling the airflow bleed therefrom; and means for vertically adjusting one of said members relative to the respective means on which it is mounted for selectively establishing the normal height of said load-supporting means.

10. The system defined in claim 9 that includes an adjustable flow restrictor between certain of said air chambers and their respective air discharge ports.

11. A vibration isolation system for mounting sensitive apparatus and the like on an underlying supporting means comprising in combination, a load-supporting frame means; a plurality of air chambers positioned at spaced locations between said load-supporting frame means and said underlying supporting means; a plurality of air controllers positioned at spaced locations along said frame means, each of said air controllers comprising conduit means connecting certain of said air chambers with a source of pressurized air, said conduit means including an air discharge port positioned in referenced relationship with one of said means, each of said air controllers further including an air-releasing member positioned in referenced relationship with the other of said means and confronting said air discharge port for controlling the discharge of airflow bleed therefrom.

12. The system defined in claim 11 that includes an adjustable flow restrictor between certain of said air chambers and their respective air discharge ports.

13. A vibration isolation system for mounting sensitive apparatus and the like on an underlying supporting means comprising, in combination, a load-supporting frame means; a plurality of air chambers positioned at spaced locations between said load-supporting frame means and said underlying supporting means; a plurality of air controllers positioned at spaced locations along said frame means, each of said air controllers comprising conduit means connecting certain of said air chambers with a source of pressurized air, said conduit means including an air discharge port positioned in referenced relationship with one of said means, each of said air control apparatus also including housing means positioned in referenced relationship with the other of said means and including a vertically extending bore forming a guide and a skirt portion forming a cover for said conduit means; an air-releasing member movably mounted in said guide and including a shoulder confronting a respective air discharge port for controlling the airflow bleed therefrom; and an adjusting means operative between said air-releasing member and said housing means for movably adjusting said member relative to said guide.

14. The system defined in claim 13 that includes an adjustable flow restrictor between certain of said air chambers and their respective air discharge ports.